United States Patent
Lee et al.

(10) Patent No.: US 9,118,090 B2
(45) Date of Patent: Aug. 25, 2015

(54) SECONDARY BATTERY

(75) Inventors: Seol-Ah Lee, Yongin-si (KR); So-Ra Lee, Yongin-si (KR); Do-Hyung Park, Yongin-si (KR); Jun-Sik Kim, Yongin-si (KR); Chong-Hoon Lee, Yongin-si (KR); Seok-Gyun Woo, Yongin-si (KR); Jong-Ki Lee, Yongin-si (KR); Min-Hwan Kim, Yongin-si (KR); Yoon-Chang Kim, Yongin-si (KR); Jake Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 515 days.

(21) Appl. No.: 13/469,788

(22) Filed: May 11, 2012

(65) Prior Publication Data

US 2012/0286719 A1     Nov. 15, 2012

(30) Foreign Application Priority Data

May 12, 2011   (KR) .................. 10-2011-0044566

(51) Int. Cl.
| | |
|---|---|
| *H02J 7/00* | (2006.01) |
| *H01M 10/42* | (2006.01) |
| *H01M 10/44* | (2006.01) |

(52) U.S. Cl.
CPC ............ *H01M 10/425* (2013.01); *H01M 10/44* (2013.01)

(58) Field of Classification Search
USPC ........................................................ 320/112
See application file for complete search history.

(56) References Cited

U.S. PATENT DOCUMENTS

| 8,063,541 B2 * | 11/2011 | Winger et al. ................ 310/339 |
| 2004/0085002 A1 | 5/2004 | Pearce |

(Continued)

FOREIGN PATENT DOCUMENTS

| JP | 2005-012980 A | 1/2005 |
| JP | 2007-096526 A | 4/2007 |

(Continued)

OTHER PUBLICATIONS

Korean Office action issued by KIPO on Sep. 19, 2012 in connection with Korean Patent Application Serial No. 10-2011-0044566 and Request for Entry of the Accompanying Office Action attached herewith.
Korean Notice of Allowance issued on Apr. 15, 2013 in the corresponding Korean Application No. 10-2011-0044566.

*Primary Examiner* — Eric Lee
(74) *Attorney, Agent, or Firm* — Robert E. Bushnell, Esq.

(57) ABSTRACT

A piezoelectric element layer is further formed as a package material of a secondary battery, so that the secondary battery can be self-charged using a voltage generated in the piezoelectric element layer according to vibration generated in an electronic device and vibration generated by movement of the electronic device itself. The secondary battery includes a battery case that accommodates an electrode assembly, the battery case having an outer coating layer and a piezoelectric element layer formed on an inner surface of the outer coating layer, and a protection circuit module mounted to an outside of the battery case and electrically connected to the electrode assembly. In the secondary battery, a voltage storage is provided to the protection circuit module, and the piezoelectric element layer converts absorbed vibration into voltage and then stores the voltage in the voltage storage so that the secondary battery is self-charged as occasion demands.

19 Claims, 4 Drawing Sheets

(56) References Cited

U.S. PATENT DOCUMENTS

2009/0001849 A1   1/2009  Tsuda
2011/0140579 A1*  6/2011  Moon et al. .................. 310/339

FOREIGN PATENT DOCUMENTS

| | | |
|---|---|---|
| JP | 2008109742 | 5/2008 |
| JP | 2009-010559 A | 1/2009 |

* cited by examiner

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on May 12, 2011 and there duly assigned Serial No. 10-2011-0044566.

BACKGROUND OF THE INVENTION

1. Field of the Invention

An aspect of the present invention relates to a secondary battery, and more particularly, to a secondary battery which can be self-charged.

2. Description of the Related Art

As electronic devices are developed, interest in batteries used in the electronic devices is also increased. Secondary batteries are used as such batteries, and charging is required to reuse these secondary batteries.

Accordingly, most people further have their auxiliary secondary batteries and carry their auxiliary secondary battery separately from their electronic devices. When a secondary battery mounted to a current electronic device is discharged, the electronic device is continuously used by replacing the secondary battery with the auxiliary secondary battery, or by charging the secondary battery through direct connection to a charger.

It is difficult, however, to carry the auxiliary secondary battery. When there is no auxiliary secondary battery and the secondary battery mounted to the electronic device is completely discharged, the electronic device cannot be used while the secondary battery is recharged by an charger. Since it is difficult to use the charger at an outside due to the limited place in which the charger can be used, it is not easy to charge the secondary battery when the secondary battery of the electronic device is completely discharged.

SUMMARY OF THE INVENTION

Embodiments provide an improved secondary battery.

Embodiments provide a secondary battery in which a piezoelectric element layer is formed as a package material of the secondary battery, so that the secondary battery can be self-charged using a voltage generated in the piezoelectric element layer according to vibration generated in an electronic device and vibration generated by movement of the electronic device itself.

According to an aspect of the present invention, there is provided a secondary battery including a battery case that accommodates an electrode assembly, the battery case having an outer coating layer and a piezoelectric element layer formed on an inner surface of the outer coating layer, and a protection circuit module mounted to an outside of the battery case and electrically connected to the electrode assembly. A voltage storage is provided to the protection circuit module, and the piezoelectric element layer converts absorbed vibration into voltage and then stores the voltage in the voltage storage so that the secondary battery is self-charged as occasion demands.

The piezoelectric element layer may be formed of a piezoelectric film layer.

The piezoelectric film layer may include a plurality of metal electrodes and a piezoelectric material layer interposed therebetween.

The piezoelectric material layer may include at least one of ceramic and polymer.

The polymer may include polyvinylidene fluoride (PVDF).

The piezoelectric material layer may be formed by laminating a plurality of sheets.

The piezoelectric material layer may be formed of powder having a nano size.

The piezoelectric element layer may include a ceramic piezoelectric layer.

The ceramic piezoelectric layer may include a zinc-oxide-based layer.

The protection circuit module may further include a rectifier circuit, a DC-DC converter and a voltage converter circuit that converts a DC voltage into a voltage inputted to the voltage storage.

A protection layer may be further formed on an inner surface of the piezoelectric element layer.

An adhesive layer may be further formed on an inner surface of the piezoelectric element layer.

As described above, according to the present invention, the secondary battery can be self-charged by including the piezoelectric element layer in the battery case. Accordingly, it is possible to increase the use time of the secondary battery without electrically charging the secondary battery using a separate charger and minimize the volume of the secondary battery. Further, since it is unnecessary to charge the secondary battery using a separate charger, it is possible to cope with inconvenience caused by the charge of the secondary battery.

BRIEF DESCRIPTION OF THE DRAWINGS

A more complete appreciation of the invention, and many of the attendant advantages thereof, will be readily apparent as the same becomes better understood by the reference to the following detailed description when considered in conjunction with the accompanying drawings in which like reference symbols indicate the same or similar components, wherein.

DETAILED DESCRIPTION OF THE INVENTION

Figure 1:
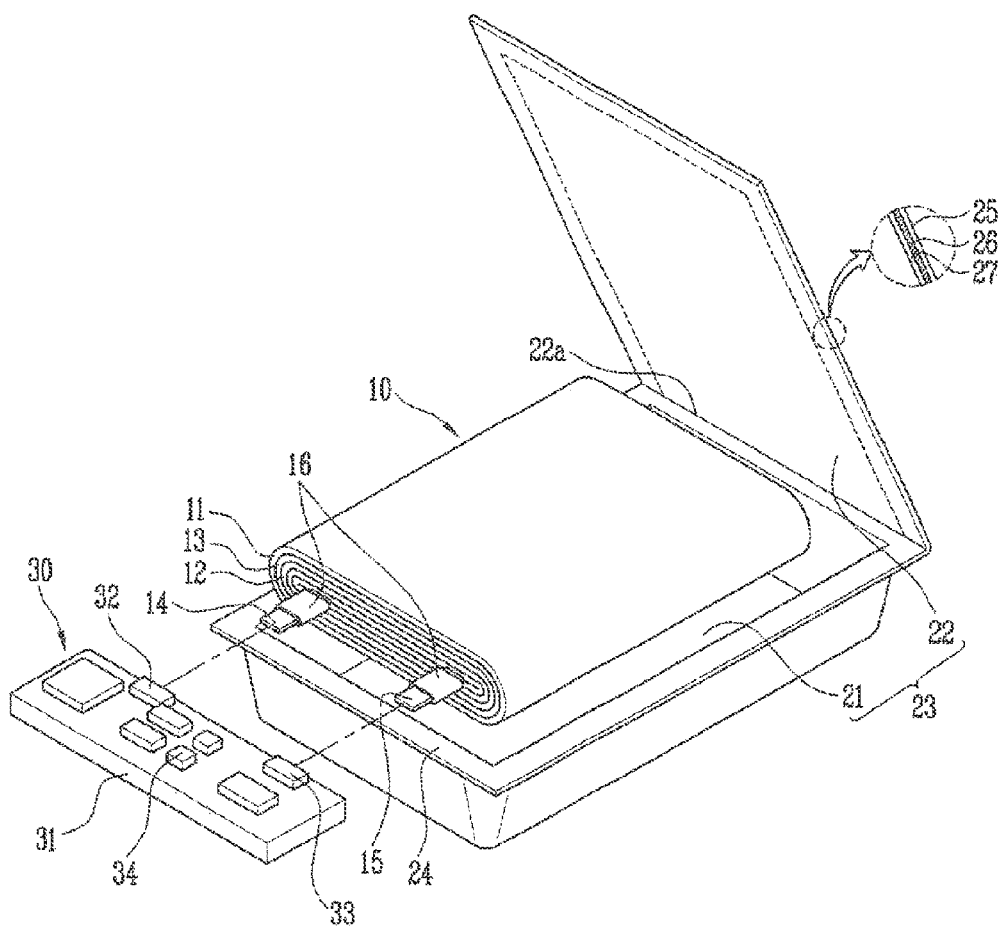
FIG. 1 is an exploded oblique view of a secondary battery constructed as an embodiment according to the principles of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, secondary batteries according to embodiments of the present invention will be described in detail with reference to the accompanying drawings.

FIG. 1 is an exploded oblique view of a secondary battery constructed as an embodiment according to the principles of the present invention.

Referring to FIG. 1, the secondary battery constructed as this embodiment includes an electrode assembly 10, a battery case 23 and a protection circuit module 30. Here, protection circuit module 30 includes a rectifier circuit 36, a DC-DC converter 37, a voltage storage 40 and a voltage converter circuit 39 that converts a DC voltage into a voltage inputted to the voltage storage. This will be described in detail with reference to FIG. 3.

Battery case 23 is composed of an accommodating portion 21 and a cover portion 22, and electrode assembly 10 is accommodated in an interior space of accommodating portion 21 that is formed of a concave shape. Cover portion 22 is formed so that one end 22a of cover portion 22 is extended from accommodating portion 21. Battery case 23 may include an outer coating layer 25, a piezoelectric element layer 26 and a protection layer 27. Piezoelectric element layer 26 and protection layer 27 are formed on an inner surface 25a of outer coating layer 25 facing electrode assembly 10. A sealing portion 24 may be formed along a circumference of each of accommodating portion 21 and cover portion 22.

Electrode assembly 10 accommodated in the inside of battery case 23 may be formed in a jelly-roll shape by winding a first electrode plate 11, a second electrode plate 12 and a separator 13 interposed therebetween. First and second electrode tabs 14 and 15 are respectively extracted from first and second electrode plates 11, 12 to an exterior side of electrode assembly 10. If first electrode tab 14 has a negative polarity, second electrode tab 15 may have a positive polarity. If first electrode tab 14 has a positive polarity, second electrode tab 15 may have a negative polarity. First electrode tab 14 may be formed of nickel or nickel alloy. Second electrode tab 15 may be formed of aluminum or aluminum alloy.

An insulation tape 16 may be further attached to a predetermined portion on at least one surface of each of first and second electrode tabs 14 and 15. Insulation tape 16 may be used to prevent a short circuit between battery case 23 and each of electrode tabs 14 and 15. Insulation tape 16 may be made of an electrical insulative resin material having an adhesive surface.

Protection circuit module 30 is mounted to an outside of battery case 23. Protection circuit module 30 is provided with first and second terminals 32 and 33 that can be electrically connected to first and second electrode tabs 14 and 15, respectively. Protection circuit module 30 has a structure in which various types of electronic components 34 are mounted on a substrate 31 having a printed circuit portion 35 printed therein. Voltage storage 40 is provided to protection circuit module 30. Piezoelectric element layer 26 absorbs vibration generated in an electronic device and vibration generated by movement of the electronic device itself, converts the absorbed vibration into electric voltage, and stores the converted voltage in voltage storage 40, so that the secondary battery can be self-charged, if necessary.

Figure 2:
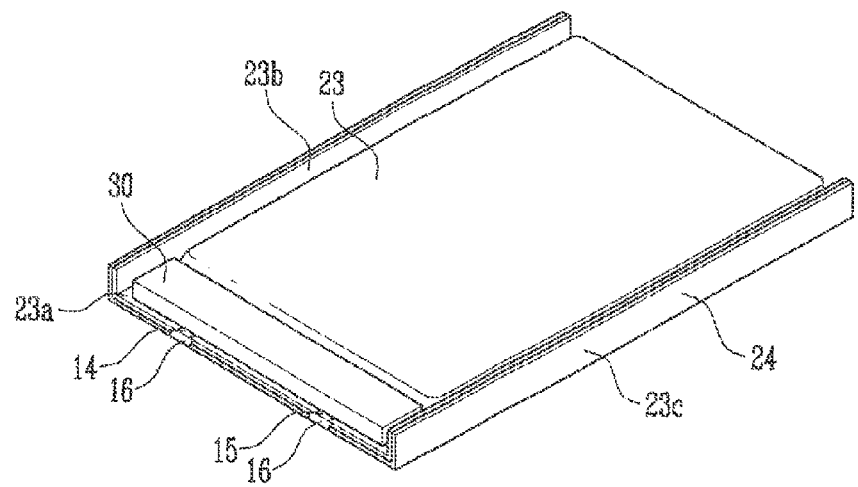
FIG. 2 is an assembled oblique view of the secondary battery of FIG. 1 constructed as the embodiment according to the principles of the present invention.

FIG. 2 is an assembled oblique view of the secondary battery of FIG. 1 constructed as an embodiment according to the principles of the present invention.

Referring to FIG. 2, in battery case 23, cover portion 22 overlaps accommodating portion 21 (see FIG. 1) (see FIG. 2), and sealing portion 24 is formed along a circumference of the overlapped portion. Sealing portion 24 is formed along a surface 23a of battery case 23 through which first and second electrode tabs 14 and 15 are exposed, and both side surfaces 23b and 23c of the exposed surface 23a. Sealing portion 24 may be folded toward sides of accommodating portion 21.

That is, sealing portion 24 is folded toward the sides of battery case 23 at least once so as to reduce the volume of the secondary battery when the secondary battery is packaged in an outer casing (not shown). Sealing portion 24 is preferably adhered closely to battery case 23.

Protection circuit module 30 may be mounted on an outside of sealing portion 24 of battery case 23 in the state that protection circuit module 30 is electrically connected to electrode assembly 10. A region of each of first and second electrode tabs 14 and 15 connected to protection circuit module 30 may be bent so that protection circuit module 30 is mounted on sealing portion 24.

Figure 3:
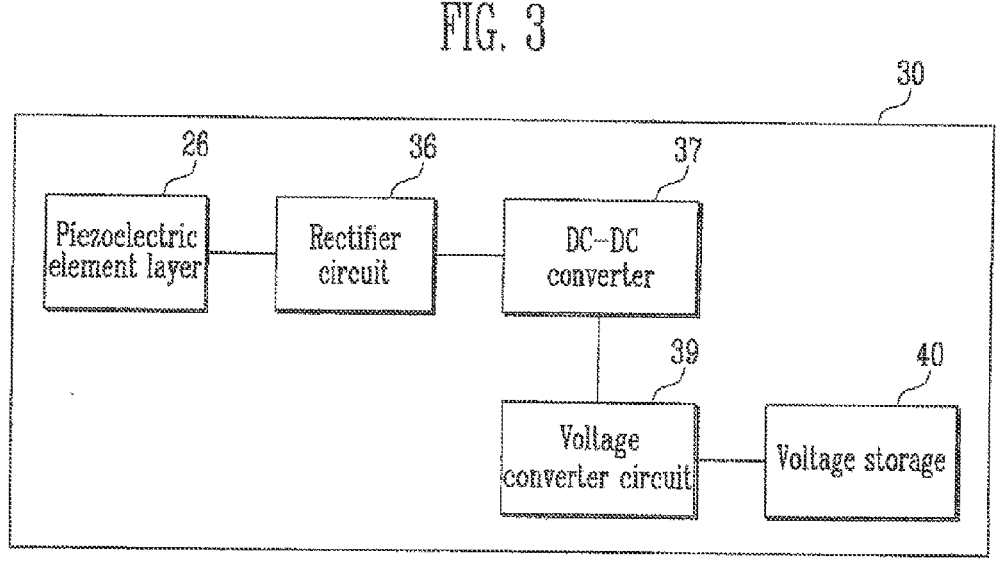
FIG. 3 is a block diagram illustrating a protection circuit module of a secondary battery constructed as an embodiment according to the principles of the present invention.

FIG. 3 is a block diagram illustrating a protection circuit module of a secondary battery constructed as an embodiment according to the principles of the present invention. Referring to FIG. 3, a process in which self-charging is performed by a piezoelectric element layer in the secondary battery constructed as the embodiment according to the principles of the present invention will be explained.

Referring to FIG. 3, protection circuit module 30 constructed as this embodiment includes rectifier circuit 36, DC-DC converter 37, voltage converter circuit 39 and voltage storage 40. Rectifier circuit 36 and DC-DC converter 37 convert electricity generated from piezoelectric element layer 26 into a DC voltage. The DC voltage is stored in voltage storage 40 via voltage converter circuit 39 for converting the DC voltage into an input voltage suitable for voltage storage 40.

Through such a process, piezoelectric element layer 26 converts absorbed vibration into a voltage, and the converted voltage is stored in voltage storage 40, so that the secondary battery can be self-charged, if necessary.

Since the electricity generated from piezoelectric element layer 26 outputs an AC pulse, the AC pulse is preferably converted into an input voltage suitable for voltage storage 40 via rectifier circuit 36 and DC-DC converter 37.

More specifically, rectifier circuit 36 includes at least one rectifier element, and the rectifier element converts the AC voltage outputted from piezoelectric element layer 26 into a DC voltage. DC-DC converter 37 converts the DC voltage outputted from rectifier circuit 36 into an AC voltage. Then, a DC voltage is formed by boosting or dropping the AC voltage using a coil, transformer, capacitor or the like and then rectifying the AC voltage.

The DC voltage generated as described above may be converted into a voltage that can be inputted to voltage storage 40 while passing through voltage converter circuit 39. Accordingly, piezoelectric element layer 26 enables the secondary battery to be self-charged using the absorbed vibration.

Figure 4:
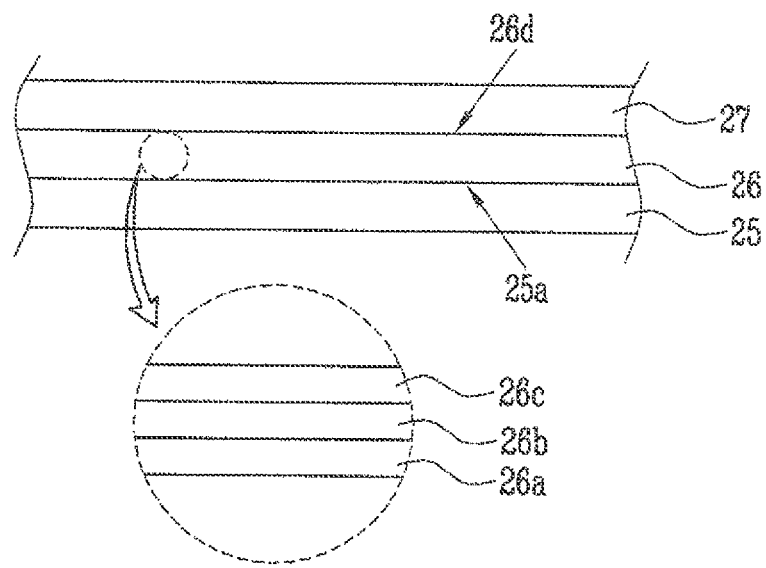
FIG. 4 is a sectional view of a battery case constructed as an embodiment according to the principles of the present invention.

FIG. 4 is a sectional view of a battery case constructed as an embodiment according to the principles of the present invention.

Referring to FIG. 4, battery case 23 (see FIG. 1) includes outer coating layer 25 that constitutes an outermost layer, piezoelectric element layer 26 and protection layer 27 that constitute an innermost layer. Specifically, as shown in FIG. 4, piezoelectric element layer 26 is formed on inner surface 25a of outer coating layer 25, and protection layer 27 is formed on inner surface 26d of piezoelectric element layer 26.

Outer coating layer 25 functions to protect the secondary battery from external environment. Accordingly, outer coating layer 25 requires an excellent tensile strength as compared with the thickness thereof. Outer coating layer 25 also requires weather resistance, and the like. Generally, an oriented nylon film is frequently used as outer coating layer 25.

Piezoelectric element layer 26 refers to an element layer in which a piezoelectric phenomenon occurs. The piezoelectric phenomenon refers to a phenomenon in which when a pressure is applied to an element layer in a certain direction, positive/negative electrical charges in proportion to an external force received by the element layer are generated on both surfaces of the element layer.

Piezoelectric element layer 26 may be formed of a piezoelectric film layer. The piezoelectric film layer includes two metal electrodes 26a and 26c and a piezoelectric material layer 26b in which a piezoelectric phenomenon occurs. Piezoelectric material layer 26b may be formed of any one selected from ceramic, polymer, and a composite of ceramic and polymer. Here, the polymer may include polyvinylidene fluoride (PVDF).

The polarization phenomenon may occur in the thickness direction of piezoelectric material layer 26b. The piezoelectric film layer is easily produced as a thin film, and has excellent impact resistance, flexibility, high-voltage resistance, water resistance and chemical stability.

Alternatively, in another embodiment according to the principles of the present invention, piezoelectric element layer 26 may be formed of a ceramic piezoelectric layer. The ceramic piezoelectric layer may be formed of a zinc-oxide-based layer.

Protection layer 27 may be formed to seal battery case 23. Protection layer 27 may provide sealing performance by being thermally bonded by heat and pressure applied in the state that electrode assembly 10 (see FIG. 1) is accommodated in battery case 23. Protection layer 27 can prevent an electrolyte and piezoelectric element layer 26 from reacting with each other, thereby improving the stability of the secondary battery. Protection layer 27 may be generally formed of a cast polypropylene film.

Figure 5A:
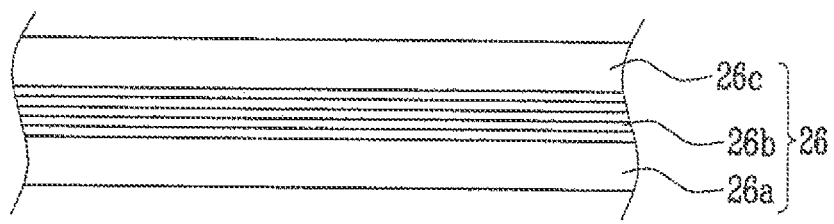
FIG. 5A is a sectional view of a piezoelectric element layer constructed as another embodiment according to the principles of the present invention.
Figure 5B:
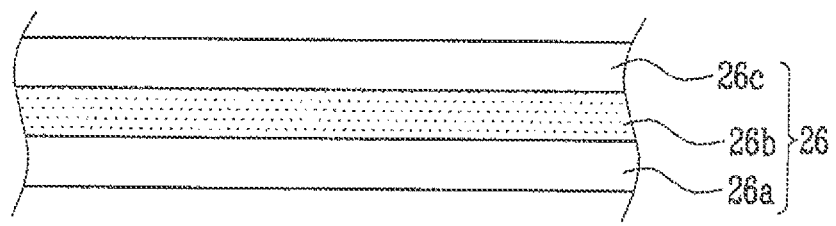
FIG. 5B is a sectional view of a piezoelectric element layer constructed as still another embodiment according to the principles of the present invention.

FIG. 5A is a sectional view of a piezoelectric element layer constructed as another embodiment according to the principles of the present invention. FIG. 5B is a sectional view of a piezoelectric element layer constructed as still another embodiment according to the principles of the present invention.

As shown in FIG. 5A, piezoelectric material layer 26b formed in the middle of piezoelectric element layer 26 may be formed by laminating a plurality of sheets. Piezoelectric material layer 26b may be variously configured. For example, piezoelectric material layer 26b may be configured into a two-layer structure including a firs PVDF layer and a second PVDF layer. The surface of the first PVDF layer may be anodized by immersing the first PVDF layer in a solution having a positive polarity, and the surface of the second PVDF layer may be cathodized by immersing the second PVDF layer in a solution having a negative polarity. Then, the two PVDF layers may be overlapped with each other, thereby forming a film in which positive and negative electrodes are repeatedly formed. That is, the positive electrodes are formed from the surfaces of the first PVDF layer that are anodized, and the negative electrodes are formed from the surfaces of the second PVDF layer that are cathodized.

As shown in FIG. 5B, piezoelectric material layer 26b may be formed of a powder having a nano size. The material of piezoelectric material layer 26b is prepared to have the nano size, thereby more improving the efficient of piezoelectric element layer 26.

The available time of the secondary battery may be changed depending on the number and material of piezoelectric material layers 26b.

Figure 6:
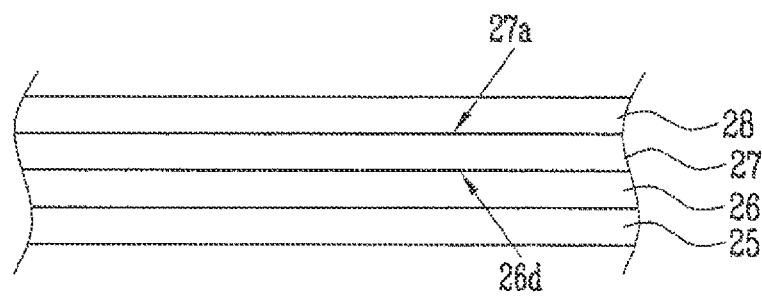
FIG. 6 is a sectional view of a battery case constructed as still another embodiment according to the principles of the present invention.

FIG. 6 is a sectional view of a battery case constructed as still another embodiment according to the principles of the present invention.

Referring to FIG. 6, in battery case 23 (see FIG. 1), an adhesive layer 28 may be further formed on an inner surface 27a of protection layer 27. Adhesive layer 28 may function to complement a low adhesion of protection layer 24 with respect to piezoelectric element layer 26.

As described above, a secondary battery constructed as an embodiment according to the principles of the present invention includes a piezoelectric element layer formed as a package material of the secondary battery and electrically connected to a protection circuit module which is mounted to an outside surface of a battery case of the secondary battery and electrically connected to an electrode assembly so that the secondary battery can be self-charged using a voltage generated in the piezoelectric element layer according to vibration generated in an electronic device and vibration generated by movement of the electronic device itself.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
    a battery case that accommodates an electrode assembly, the battery case having an outer coating layer and a piezoelectric element layer formed on an inner surface of the outer coating layer; and
    a protection circuit module mounted to an outside surface of the battery case and electrically connected to the electrode assembly,
    wherein a voltage storage is provided to the protection circuit module, and the piezoelectric element layer converts absorbed vibration into an input voltage and then stores the input voltage in the voltage storage so that the secondary battery is self-charged as occasion demands.

2. The secondary battery according to claim 1, wherein the piezoelectric element layer comprises a piezoelectric film layer.

3. The secondary battery according to claim 2, wherein the piezoelectric film layer comprises a plurality of metal electrodes and a piezoelectric material layer interposed therebetween.

4. The secondary battery according to claim 3, wherein the piezoelectric material layer comprises at least one of ceramic and polymer.

5. The secondary battery according to claim 4, wherein the polymer comprises polyvinylidene fluoride (PVDF).

6. The secondary battery according to claim 3, wherein the piezoelectric material layer is formed by laminating a plurality of sheets.

7. The secondary battery according to claim 3, wherein the piezoelectric material layer is formed of a powder having a nano size.

8. The secondary battery according to claim 1, wherein the piezoelectric element layer comprises a ceramic piezoelectric layer.

9. The secondary battery according to claim 8, wherein the ceramic piezoelectric layer comprises a zinc-oxide-based layer.

10. The secondary battery according to claim 1, wherein the protection circuit module further comprises a rectifier circuit, a DC-DC converter and a voltage converter circuit that converts a DC voltage from the DC-DC converter into the input voltage inputted to the voltage storage.

11. The secondary battery according to claim 1, wherein a protection layer is further formed on an inner surface of the piezoelectric element layer.

12. The secondary battery according to claim 11, wherein the protection layer is formed of a cast polypropylene film.

13. The secondary battery according to claim 1, wherein an adhesive layer is further formed on an inner surface of the piezoelectric element layer.

14. The secondary battery according to claim 1, wherein the outer coating layer comprises an oriented nylon film.

15. The secondary battery according to claim 1, wherein the battery case comprises an accommodating portion accommodating the electrode assembly, and a cover portion covering and overlapping the accommodating portion,
a sealing portion is formed along a circumference of an overlapping portion of the accommodating portion and the cover portion, and
at least a portion of the sealing portion is folded toward sides of the accommodating portion.

16. A secondary battery, comprising:
a battery case that accommodates an electrode assembly, the battery case having an outer coating layer disposed to protect the secondary battery from external environment, a piezoelectric element layer formed on an inner surface of the outer coating layer, and a protection layer formed on the piezoelectric element layer and sealing the battery case; and
a protection circuit module mounted to an outside surface of the battery case and electrically connected to the electrode assembly,
wherein a voltage storage is provided to the protection circuit module, and the piezoelectric element layer converts vibration of the piezoelectric element layer into voltage and stores the voltage in the voltage storage so that the secondary battery is self-charged when occasion demands.

17. The secondary battery according to claim 16, wherein the piezoelectric element layer comprises a piezoelectric film layer.

18. The secondary battery according to claim 17, wherein the piezoelectric film layer comprises a plurality of metal electrodes and a piezoelectric material layer interposed therebetween.

19. The secondary battery according to claim 18, wherein the piezoelectric material layer is formed by laminating a plurality of sheets.

* * * * *